May 12, 1970
J. TILTINS
3,512,026
ALTERNATOR
Filed Oct. 9, 1968
2 Sheets-Sheet 1
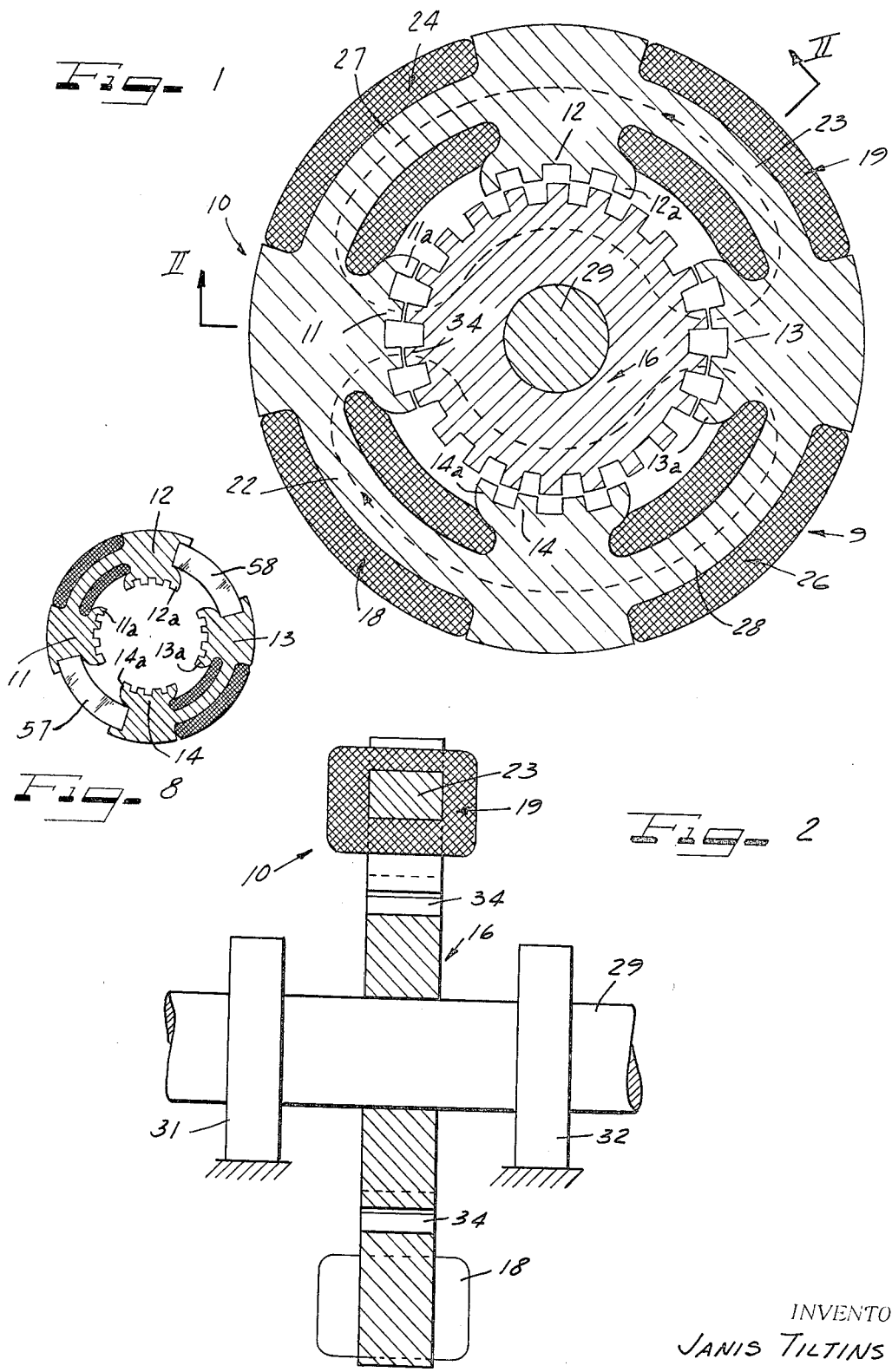
INVENTOR.
JANIS TILTINS
BY ATTORNEYS May 12, 1970          J. TILTINS          3,512,026
ALTERNATOR
Filed Oct. 9, 1968          2 Sheets-Sheet 2
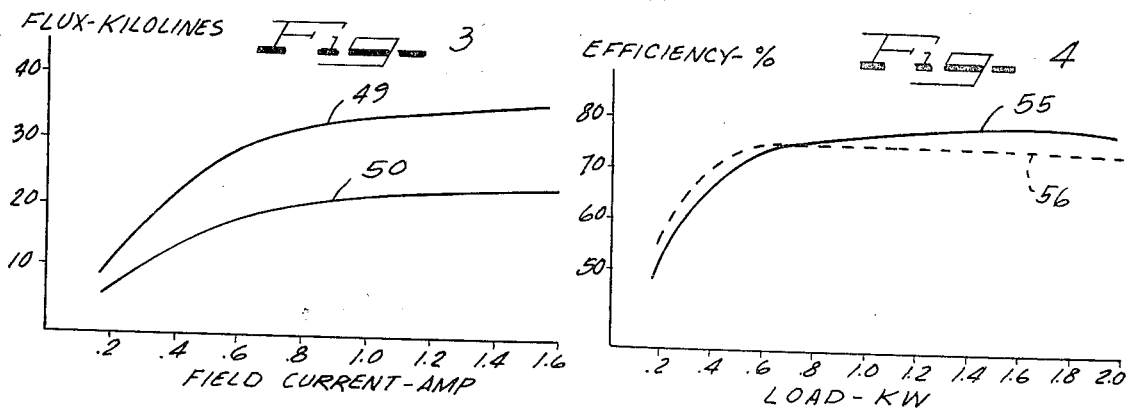
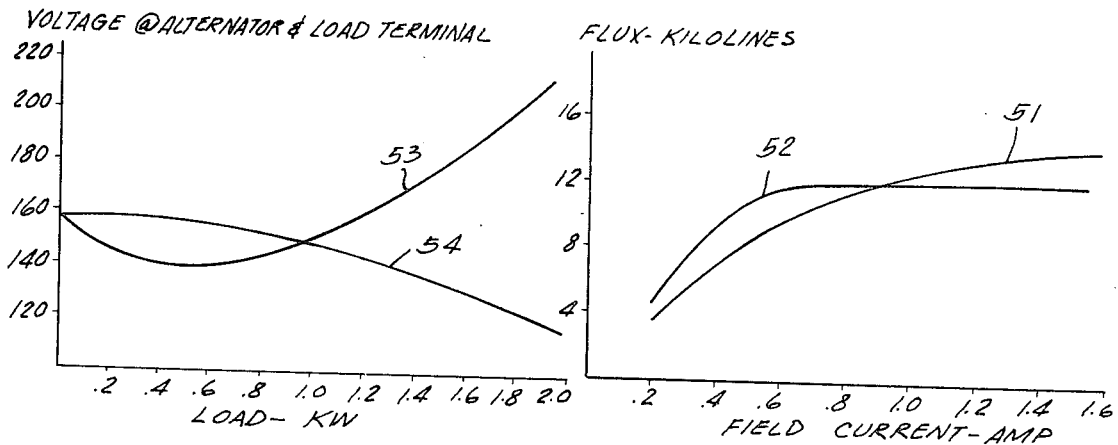
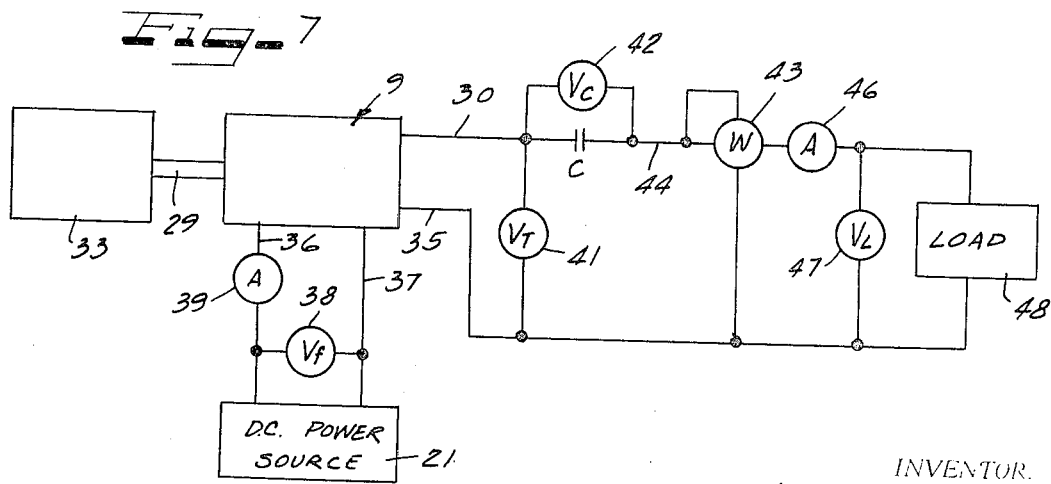
INVENTOR.
JANIS TILTINS
BY *Hill, Sherman, Meroni, Gross & Simpson* ATTORNEYS

United States Patent Office 3,512,026
Patented May 12, 1970

3,512,026
ALTERNATOR
Janis Tiltins, South Euclid, Ohio, assignor to TRW Inc., Cleveland, Ohio, a corporation of Ohio
Filed Oct. 9, 1968, Ser. No. 766,073
Int. Cl. H02k 17/42
U.S. Cl. 310—168          1 Claim

ABSTRACT OF THE DISCLOSURE

An alternator which may be driven at relatively low speed and produces a high frequency output has a stator formed with a plurality of longitudinally extending teeth and a rotor which is also formed with longitudinally extending teeth. The alternator is excited by direct current power applied to windings on the stator and power is removed from A.C. windings mounted on the stator. The alternator may be operated to provide outputs over a wide frequency range.

BACKGROUND OF THE INVENTION

Field of the invention

The invention relates in general to alternators and in particular to machines which can be driven at relatively low speeds to produce high frequency output power.

Description of the prior art

Conventional rotating electrical machines such as alternators require a large number of poles to obtain high frequency outputs when the rotor is driven at conventional speeds. Large numbers of poles in an alternator result in a complicated and expensive machine and requires a large number of windings.

SUMMARY OF THE INVENTION

The present invention comprises an alternator with a laminated rotor formed with a plurality of teeth which is supported in a stator formed with poles having teeth. The stator is laminated and has direct current excitation windings and alternating current output windings. Alternator frequencies determined by the number of rotor poles and the shaft speed and the teeth on the stator poles allows the number of rotor poles to be substantially increased. The field excitation windings may also be replaced by permanent magnets.

Advantages of the alternator of this invention over conventional alternators are (1) considerable higher alternator output frequency can be obtained without increasing the shaft speed of the machine and (2) the output of the alternator of this invention increases as the frequency increases. This results in the weight of the alternator being lower than that of conventional alternators operated at the same shaft speed.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a sectional view taken through the alternator of this invention;

FIG. 2 is a sectional view on line II—II of FIG. 1;

FIG. 3 is a graph illustrating the flux variation in the magnetic circuit with excitation;

FIG. 4 is a graph of the alternator efficiency vs. output with a shaft speed of 24,000 r.p.m.;

FIG. 5 is a graph of voltage regulation at a shaft speed of 24,000 r.p.m.;

FIG. 6 is a graph of the flux variation in the magnetic circuit with excitation;

FIG. 7 illustrates a test setup for determining efficiency and various characteristics of the alternator; and FIG. 8 illustrates a modification of the invention which utilizes permanent magnet excitation.

DESCRIPTION OF THE PREFERRED EMBODIMENTS

FIGS. 1 and 2 illustrate the low speed high frequency flux switch alternator of this invention. The stator 10 of the alternator is formed of stack laminations to form the stator poles 11, 12, 13 and 14 which are formed with teeth 11a, 12a, 13a and 14a, respectively, adjacent the rotor 16. A pair of excitation windings 18 and 19 are mounted on the stator with the winding 18 mounted between the poles 11 and 14 and the winding 19 mounted between the poles 12 and 13 as shown. As best shown in FIG. 7 a suitable D.C. power source 21 is connected to the windings 18 and 19 to energize them to produce flux in the stator and rotor as shown by the dotted arrows passing through the stator portions 22 and 23, respectively, about which the windings 18 and 19 are mounted.

A.C. output windings 24 and 26 are mounted on stator portions 27 and 28, respectively, with winding 24 mounted between poles 11 and 12 and winding 26 mounted between poles 13 and 14. These windings are connected together and have output leads 30 and 35 as shown in FIG. 7.

The rotor 16 is mounted on a drive shaft 29 which is mounted in suitable support bearings 31 and 32 as best shown in FIG. 2, and is driven by a motor 33 as best shown in FIG. 7. The rotor 16 is formed of laminations which are stacked together and has a plurality of longitudinally extending teeth 34.

For a particular machine an output power of 100 watts at 120 volts at 440 hertz was desired with the rotor being driven at 1200 r.p.m. A stator with an internal diameter of 2.5 inches and with a length of 0.625 inch was used. With a gap of 0.007 inch between the stator and the rotor the number of rotor teeth may be calculated from the equation $$Qr = \frac{f \times 60}{\text{r.p.m.}} = \frac{440 \times 60}{1200} = 22$$

where $f$ is the desired frequency

The tooth pitch is calculated from the formula $$t = \pi \frac{2.5}{22} = 0.357 \text{ or } \frac{t}{2} = 0.187 \text{ inch}$$

The tooth width $tw = 0.178$ minus $0.035 = 0.143$ inch.
The number of turns in the A.C. windings 24 and 26 are 720 turns per coil.

FIG. 1 illustrates a rotor with 22 teeth 34 as given in the example of the above design and a stator with poles 11, 12, 13 and 14 are formed with 4 teeth each. The teeth 11a, 12a, 13a, and 14a have the same width as the teeth 34. It is to be particularly noted that in the position of the rotor shown in FIG. 1 that the teeth 11a of the pole 11 and 13a of pole 13 are aligned with the teeth 34 of the rotor and the teeth 12a of pole 12 and the teeth 14a of the pole 14 are out of alignment with the teeth 34 of the rotor. At this position of the rotor a substantial portion of the flux produced by the windings 18 and 19 passes through the stator and rotor as shown by the dotted lines and arrows in FIG. 1. Thus, the flux linking windings 24 and 26 will be as shown by the dotted arrows.

At other times the teeth 12a will be aligned with the teeth 34 of the rotor and the teeth 14a of pole 14 will be aligned with the teeth 34 of the rotor whereas the teeth 11a and 13a will be out of alignment with the teeth 34 of the rotor. At that time the flux linkage from winding 18 will link winding 24 and the flux from winding 19 will link winding 26. Thus, due to the teeth on the rotor and stator, the flux linkage between the windings change resulting in an alternating current output from the windings 24 and 26.

It is to be realized that the windings 24 and 26 are electrically connected together and have output leads 30 and 35 as shown in FIG. 7 on which the output appears.

The alternator successfully operates over a wide frequency range. For example, when the rotor of the alternator was driven at 24,000 r.p.m. and the number of turns of the A.C. windings 24 and 26 were 38 turns per coil, 120 volt output at 2 kilowatts was obtained. The field power at that load was only 10 watts and the efficiency if the alternator was above 75% over a load range from 0.7 to 2.0 kilowatts.

FIG. 7 illustrates the test setup wherein the D.C. power source 21 has an output voltmeter 38 connected across its terminals and an ammeter 39 connected in one of the supply leads 36. The leads 36 and 37 are connected to the windings 18 and 19, respectively, to provide field energization. The A.C. windings 24 and 26 are connected to leads 30 and 35 and an output voltmeter 41 is connected across these leads. A capacitor C is connected in line 30 and a voltmeter 42 is connected across the capacitor. A wattmeter 43 is connected between leads 35 and 44 and an ammeter 46 is connected in lead 44. A voltmeter 47 is connected across the load 48 which is connected to the leads 44 and 35.

FIG. 3 illustrates the flux variation in the magnetic circuit with changes in field current. Curve 49 illustrates the total flux produced by the field winding and curve 50 is a plot of the flux in the stator pole when the rotor and stator teeth are aligned.

FIG. 6 also illustrates the flux variation in the magnetic circuit with excitation and curve 51 illustrates the flux in the stator pole when the rotor and the stator teeth are not aligned, and curve 52 is a plot of the flux linking the A. C. windings 24 and 26.

FIG. 5 is a plot of voltage regulation with a field current of 1 ampere and a shaft speed of 24,000 r.p.m. and with a capacitor C of 1.5 microfarad. Curve 53 is the voltage at the alternator terminals as measured by the voltmeter 41 and curve 54 is a plot of the voltage at the load terminals as measured by the voltmeter 47.

FIG. 4 is a plot of the alternator efficiency vs. output with a shaft speed of 24,000 r.p.m. and curve 55 in solid line is the efficiency with a voltage of 120 volts at the load terminal as measured by the voltmeter 47 and the curve 56 in dotted lines is the efficiency with the voltage at the load terminal equal to 100 volts.

FIG. 8 illustrates a modification of the stator of the invention in which the excitation is provided by permanent magnets 57 and 58 rather than the windings 18 and 19. A.C. windings 24 and 26 are alternately linked by the flux from the permanent magnets 57 and 58 to produce a high frequency output. The operation of the machine with a stator as illustrated in FIG. 8 is similar to the machine of FIG. 1 with the excitation windings 18 and 19.

The alternator of the present invention is flexible and may be designed to operate over a wide speed range to provide a low cost machine for high frequency power generation.

Although various minor modifications might be suggested by those versed in the art, it should be understood that I wish to embody within the scope of the patent warranted hereon all such modifications as reasonably and properly come within the scope of my contribution to the art.

I claim as my invention:

1. An alternator comprising a rotor and stator, said stator having a cylindrical frame from which a plurality of radially extending poles extend inwardly, said poles formed with teeth, said rotor rotatably supported in said stator and formed with teeth of the same size as the teeth of said stator poles, the teeth of the rotor and said stator poles positioned such that the teeth of alternate poles are out of alignment with adjacent rotor teeth when the teeth of the other poles are aligned with the adjacent rotor teeth, a plurality of exciting windings wound about the frame of the stator between alternate portions of the frame between said poles and said windings wound so that one side of the windings lie adjacent the rotor teeth and the other sides lie on the outside of the frame, and a plurality of output windings wound about the portions of the frame of the stator between said poles on which the exciting windings are not wound and said windings wound so that one side of said windings lie adjacent the rotor teeth and the other sides lie on the outside of the frame.

References Cited

UNITED STATES PATENTS

| | | | |
|---|---|---|---|
| 1,583,809 | 5/1926 | Stroller | 310—169 |
| 2,505,130 | 4/1950 | Maynard | 310—155 |
| 2,648,021 | 10/1953 | Kaczor | 310—168 |
| 2,945,141 | 7/1960 | Van De Graaff | 310—168 |
| 3,157,810 | 11/1964 | Adkins | 310—168 |
| 3,264,504 | 10/1966 | Lamorlette | 310—168 |

J. D. MILLER, Primary Examiner

R. SKUDY, Assistant Examiner

U.S. Cl. X.R.

310—159, 165